Oct. 30, 1962 C. USCHMANN 3,060,506
MOLDING PRESS
Filed June 24, 1957 5 Sheets-Sheet 1

INVENTOR.
CURT USCHMANN
BY
Reynolds, Beach & Christensen
ATTORNEYS

Oct. 30, 1962     C. USCHMANN     3,060,506
MOLDING PRESS Filed June 24, 1957     5 Sheets-Sheet 5

INVENTOR.
CURT USCHMANN
BY
Reynolds, Beach & Christensen
ATTORNEYS

United States Patent Office 3,060,506
Patented Oct. 30, 1962

3,060,506
MOLDING PRESS
Curt Uschmann, Rte. 3, near Lebanon, Oreg.
Filed June 24, 1957, Ser. No. 667,439
5 Claims. (Cl. 18—16.5)

The molding press of this invention is used for the manufacture of products molded from waste material such as waste wood products which may be in the form of shavings, sawdust, wood fiber, chopped cornstalks, chopped bagasse, or similar woody material. The molding press employing the principles of this invention can be used for making a variety of molded articles.

A principal object of the present invention is to provide a press which will make a number of molded article units in a single operation quickly and with a minimum of labor.

A further important object of the invention is to provide press mechanism which will exert pressure on various portions of the surface of a molded article positively so as to obtain substantially uniform density throughout the molded product or at least substantialy uniform surface compaction in various portions of the surface. In accomplishing such object pressure is exerted on the material in the mold cavity by members moving into the mold cavity in a plurality of directions.

It is also an object to provide a molding press which will operate as automatically as possible, requiring only that material to be molded be supplied to the mold cavities, the molding operation initiated and the completed products removed from the press.

Another object is to provide molding press mechanism which can produce molded articles of materials required to be set by heat and pressure.

In the production of molded articles it is an object to enable the density of the molded product to be altered by making relatively simple changes in the molding press which can be effected quite quickly so as to accommodate a larger or smaller amount of material to be molded into a given shape.

A further object is to provide a molding press incorporating readily replaceable parts suitable for molding products of different size and shape.

Despite the automatic character of the molding press operation it is an object to provide safety features which will insure that the press cannot close while material to be molded is being supplied to the press molding cavities or completed products are being removed from the press. Nor can the press close in initiating a molding cycle until the operator has effected a positive control operation requiring manipulations by both the operator's hands at locations outside the press opening.

These objects can be accomplished by a molding press which includes generally a stationary block having in it a plurality of mold cavities and plungers carried by an upper movable block for insertion into the upper ends of the mold cavities and lower plungers carried by a lower movable block moved into the lower ends of the mold cavities to form bottoms in them to exert a positive pressure on the lower sides of articles being molded and to extract finished articles from the mold cavities following completion of each molding operation. Such mold cavities can be formed as replaceable sleeves and the tips of the upper and lower plungers can be removed for replacement with plunger tips of a size and shape to fit the particular mold cavities of the sleeves in the stationary block.

The waste material utilized in producing molded products in the press of the invention usually is supplied to the plant in more or less comminuted form. Such raw material of woody form may for example be planer shavings, hogged or chipped wood waste, chopped cornstalks, chopped bagasse or similar material. Such comminuted waste may be dumped from delivery vehicles or mechanism such as trucks, railway cars, ships, scows or conveyors into a pit 1 from which the material is removed by a screw conveyor 2 by which the material is delivered to a hammermill 3. By this hammer mill the comminuted waste material is reduced to reasonably fine fibrous or sliver condition and is blown from the hammer mill by blower 4 through pipe 5 into the storage bin 6. As an alternate to the materials mentioned sawdust can be used as the waste material in which event it may not be necessary to pass it through a hammer mill but it can be conveyed directly to the storage bin.

In order to obtain a hard, dense product when the waste material is molded it is preferred that binder be mixed with the woody material. Such binder can be of thermosetting resin type such as phenolic resin or urea formaldehyde resin, for example. Such resin is dispensed by a measuring device 7 into a conveyor such as the screw conveyor 8 by which the woody material is withdrawn from the storage bin 6. Other types of binder such as used for bonding veneer in the manufacture of hardboard can be used and these may be either of the cold setting type or of the thermosetting type but the latter type is preferable. The amount of resin used may vary from three percent to fifteen percent by weight of the woody material depending upon the type of binder used and the density of the product desired.

Figures 1, 11, 12, 13:
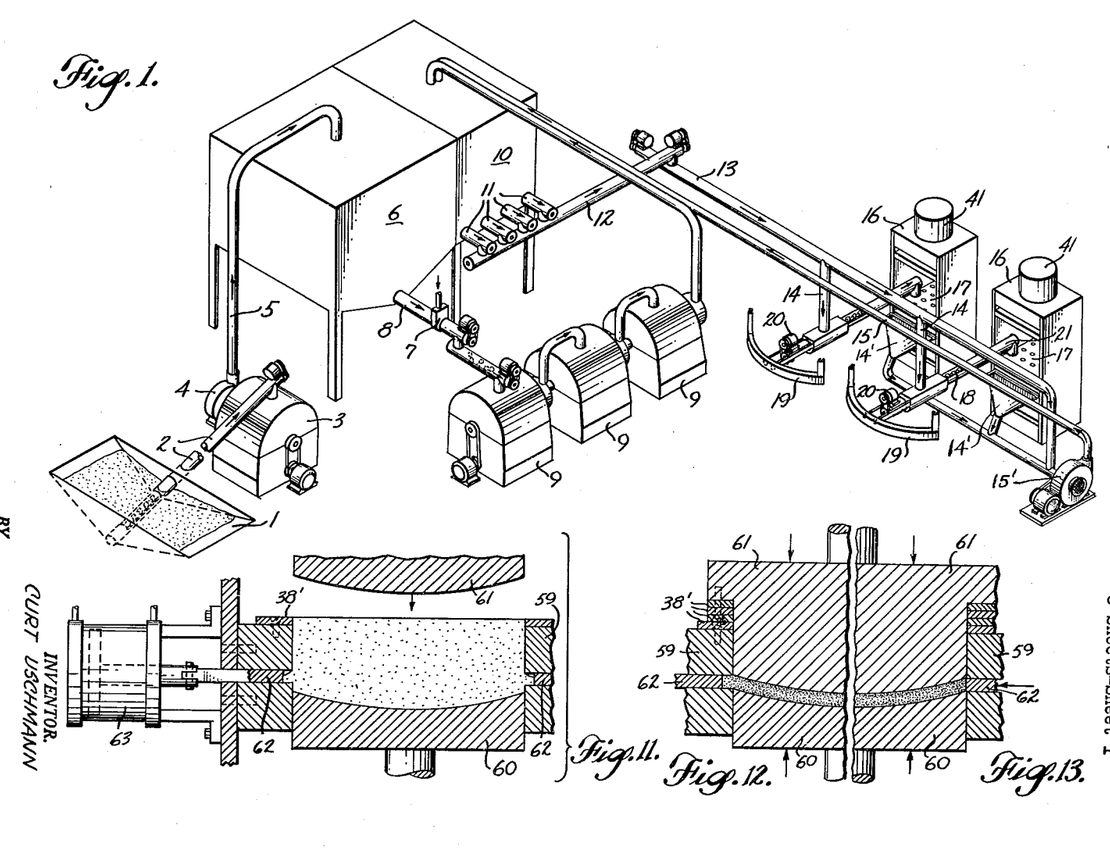
FIGURE 1 is a top perspective view of a molding press installation showing various components to prepare and supply to molding presses material to be molded.
FIGURE 11 is a vertical sectional view through a portion of a press employed to make a different type of molded product from those made by the presses shown in the preceding figures.
FIGURE 12 is a similar view with parts broken away and showing the parts of the press in a different operative position.
FIGURE 13 is a view similar to FIGURE 11 with parts broken away and showing the parts in the positions assumed upon completion of the pressing operation.

In order to insure thorough mixing of the binder with the comminuted waste woody material the mixture of resin and such material is passed through one or more mixing hammer mills 9, three such hammer mills being shown in series in FIGURE 1. From these mixing hammer mills the resin-impregnated woody material is blown into a second storage bin 10, and when needed for molding is withdrawn through one or more outlets 11 depending upon the quantity required. This material is conveyed by screw conveyors 12 and 13 to one or more molding press supply ducts 14 depending from conveyor 13, two such ducts being shown in FIGURE 1. Any excess molding material remaining after all the mold cavities of a press are filled is swept from such press into a receiving hopper 14', from which it can be returned to the storage bin 10 through the return duct 15 connected to the discharge port of a blower 15'. All the hoppers 14' and the end of the screw conveyor 13 beyond the press supply ducts are connected to the inlet of such blower.

Each press 16 includes a stationary mold cavity block 17 containing cavities into which molding material is to be delivered. Mechanism for conveying molding material from a duct 14 and distributing it into the various mold cavities of the block 17 includes a screw conveyor 18 suspended on the lower end of the duct 14 and swingable about the center of such duct. One end of the conveyor mechanism can be supported and guided for such swinging movement by an arcuate track 19 with which rollers on one end of the screw conveyor mechanism engage. The screw conveyor is driven by an electric motor 20 mounted on this swinging end portion of the conveyor mechanism at the side of the duct 14 remote from the molding press 16.

On the swinging end of the screw conveyor adjacent to the molding press is slidably mounted a molding material distributing sleeve 21. This sleeve may be slid toward and away from the screw conveyor 18 to move its discharge end over the stationary mold cavity block in a direction lengthwise of the conveyor 18. By swinging the supply means the sleeve's discharge end can be moved transversely of the length of the supply duct. Thus by a combination of lengthwise movement and transverse swinging of the sleeve 21, its discharge end can easily and quickly be shifted into registry with a mold cavity in any portion of the stationary block 17. After the mold cavities are all filled the discharge end of the sleeve can be shifted out from beneath a downwardly movable upper block carrying plungers to close the upper sides of the cavities.

Figure 2:
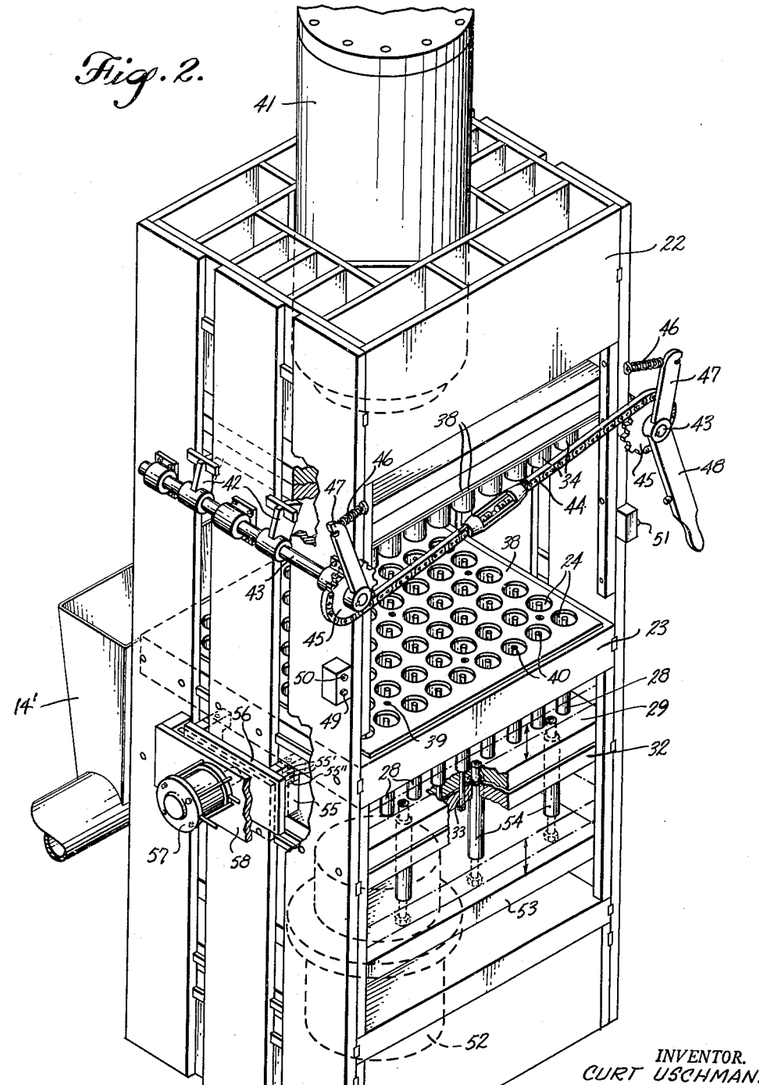
FIGURE 2 is a top perspective view of a molding press in open condition with parts broken away.

The complete press is shown in FIGURE 2 as including a frame 22 having mounted in its central portion the stationary block 23 in which the mold cavities 24 are formed. While these cavities could be cast or machined directly in the stationary block 23 of the molding press, it is preferred that such cavities be formed by the hollow with a removable sleeve 25 so that by changing the sleeves, mold cavities of different shape and size can be formed. To hold such sleeves in the block 23, such block may have bores formed in it which have shoulders 26 engageable by complemental shoulders on the exteriors of the sleeves 25 to limit downward movement of such sleeves.

In order to enable the mold cavities to retain molding material in them it is necessary that mechanism be provided to form bottoms in them. In accordance with the present invention such bottoms are movable at predetermined stages of the press molding operation for the purpose of compacting the lower surface of each article being molded and to extract the article from its mold cavity. The bottom of each mold cavity is shown as being formed by the tip 27 of a plunger 28. The lower ends of all of these plungers are mounted in a lower movable block 29 which is movable generally vertically for raising and lowering the plungers 28.

While such plungers could be mounted removably in the block 29 so that the entire plunger could be replaced with one of proper size and shape to cooperate with the particular mold cavity sleeve 25 in a bore of stationary block 23, it is preferred that each plunger be composed of several parts one of which will be permanently attached to the block 29. Such permanently attached part is a core tube having a reduced lower end inserted into a bore in the block 29 and secured in place by one or more set screws 30 shown in FIGURE 7, for example. The core tube is thus held rigidly in place so that the plunger will be aligned accurately concentrically of a bore in the stationary block 23.

In the upper end of this core tube is a threaded cavity into which may be screwed a downwardly projecting threaded boss on a plunger tip 27. Such tip may be selected to have the shape and be of the size desired to cooperate with a selected sleeve 25 fitted in a bore of the block 23 and of a size to close snugly the lower end of such sleeve. In addition encircling the core tube of the plunger is a sleeve having a bore of a size to fit snugly onto the exterior of the core tube and having an exterior size and shape corresponding to the peripheral size and shape of the tip 27. The length of such sleeve will be such as to span the distance between the upper side of the lower block 29 and the bottom of the plunger tip 27 when it is screwed fully into the plunger core tube.

In many instances it may be desirable to mold a product having a hole through its center such as a core block for a paper roll. Such a hole is produced by providing a rod extending upward through the mold cavity and disposed centrally of it. The plunger 28 including both the core tube and the replaceable tip are apertured centrally to enable such a rod 31 to extend through the plunger into the mold cavity 24 without constituting a portion of the plunger. Instead the rod 31 extends downward entirely through the plunger 28 into and preferably through a lower stationary block 32 to which the lower end of such rod is secured. In the construction shown the lower end of rod 31 has a reduced portion 33 forming a shoulder which will bear on the upper side of the lower stationary block 32 as the lower end of the rod is moved downward through an aperture in the block 32. To secure the reduced rod portion 33 in the block aperture the lower end of the rod can be threaded to receive a nut.

If it should be desired to mold a product having no hole in it the rod 31 can be removed and the plunger tip 27 replaced by an imperforate tip. Alternatively the rod 31 could be replaced by a smaller rod and the tip 27 would be replaced by a tip having in it a smaller hole which would fit the smaller rod 31 snugly. The rods 31 and the plunger tips provide mutual support to assist in maintaining accurate alignment of the plungers with the mold cavities and to maintain both of these parts in positions exactly concentric with the mold cavity sleeve irrespective of the position of vertical adjustment of the plunger 28.

In a press molding operation loose molding material placed in a mold cavity is compacted by mechanism which will decrease the volume of the mold cavity. Such reduction in volume of each mold cavity is accomplished principally by a plunger 34 moving downward into the mold cavity. These plungers are carried by and project downwardly from an upper movable block 35. Each plunger 34 is of course mounted on such movable block in precise alignment with its corresponding cavity in the stationary mold cavity block 23. Moreover the plungers will be of a size and shape to descend into and fit snugly the hollows of the corresponding sleeves 25 inserted in the bores of the stationary block.

As has been mentioned the sleeves 25 are replaceable with sleeves having bores of different size depending upon the shape and size of the particular articles to be produced. Consequently, the plungers 34 are replaceable so that plungers can be selected for mounting in the upper block 35 in accordance with the particular type of sleeve 25 being used. While plungers 34 could be of unitary construction it is preferred that they be composed of several parts. Thus each plunger may include a core tube having a reduced upper end which will fit into a bore in the upper movable block 35 and have a shoulder which will bear against the lower side of this movable block. Like the lower plungers 28 the upper plungers 34 can be secured to the movable block 35 by set screws 36.

The bottom ends of the upper plungers 34 may be formed by removable tips 37 having externally threaded bosses which can be screwed into threaded cavities in the lower ends of the plunger core tubes. These plunger tips have in them apertures of a size to slide smoothly over the upper ends of the rods 31 upstanding in the mold cavities as the upper plungers are moved downward by descent of the upper movable block 35. Plunger sleeves are provided which fit snugly over the core tubes, have an external size and shape corresponding to the peripheral size and shape of the plunger tips 37 and are of a length to extend from the bottom of the movable block 35 to the shoulders of the tips 37 projecting outwardly beyond the core tubes.

The molding material of which the articles are to be molded is compressible to an indeterminate extent depending upon the amount of pressure applied by the plungers. In order to produce a molded article of desired shape and dimensions, therefore, it is necessary to provide a positive stop arrangement limiting movement of the plungers 34 downward into the mold cavities 24. Preferably such limitation of plunger movement is effected by abutment of the movable press mechanism carrying the upper plungers 34 with the stationary portion of the press in which the mold cavities 24 are formed. It may be desirable, however, to make a particular molded product of greater or lesser density, or depending upon the molding material being used it may be necessary to compress the molding material to a greater or lesser extent in order to obtain a product of predetermined size and shape having a desired density. Consequently, it is desirable to provide press mechanism which can be altered readily to vary the amount of reduction in mold cavity volume during the pressing operation. In addition, the effect of increasing the compression of the molding material can be produced by increasing the initial volume of the mold cavity as compared to the volume of the final molded product.

Figure 3:
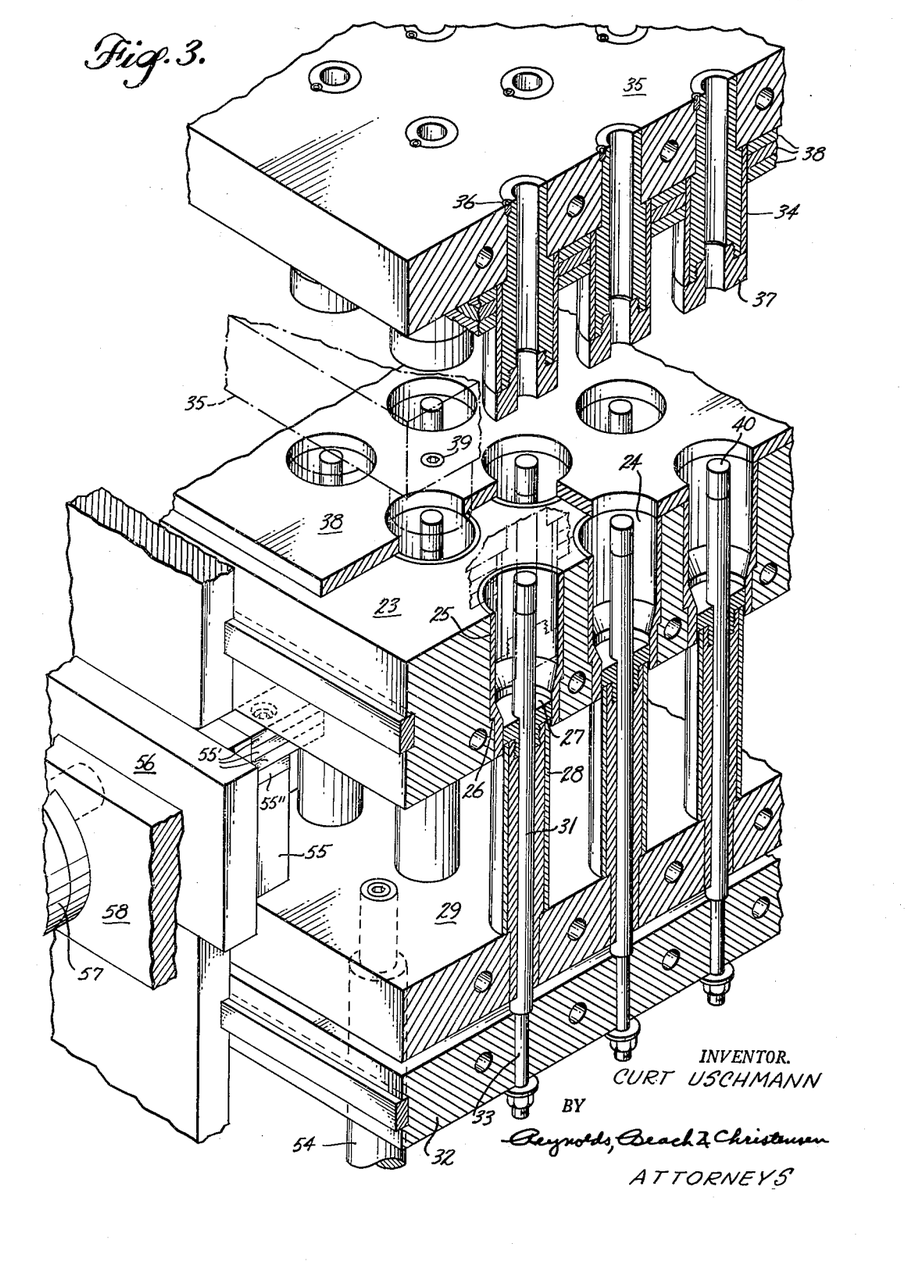
FIGURE 3 is a top perspective view of the central portion of the molding press with parts broken away to show internal structure.
Figures 8, 9, 10:
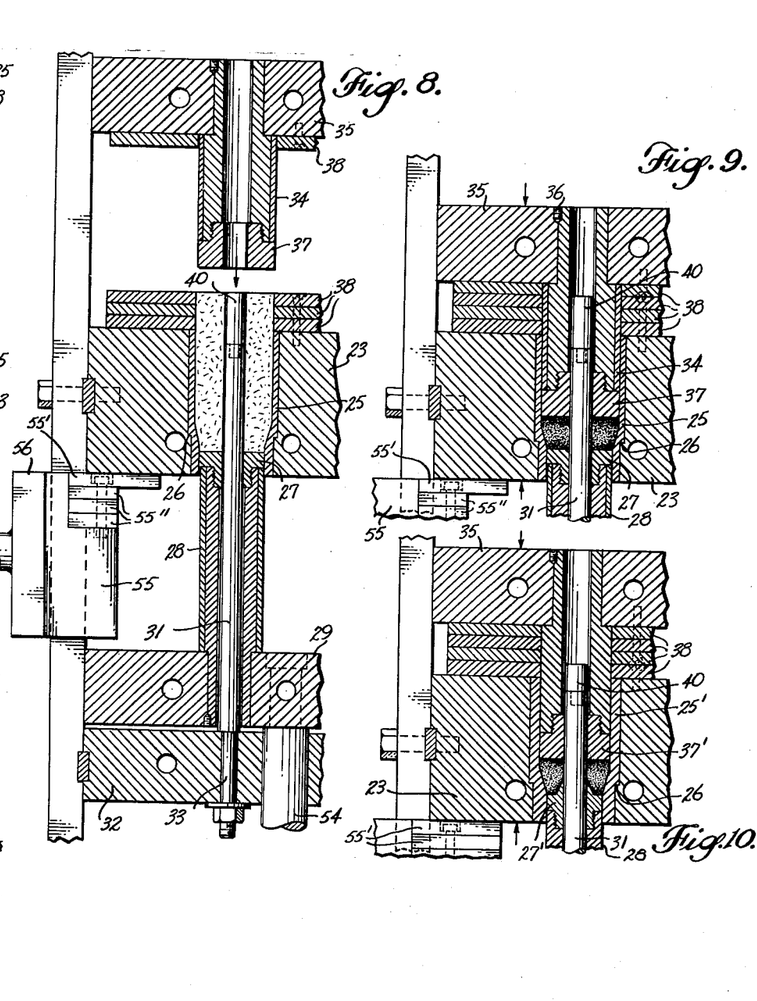
FIGURE 8 is a fragmentary vertical sectional view through a portion of the press similar to FIGURE 4 but with parts interchanged to increase the capacity of the mold cavity.
FIGURE 9 is a similar view but with the parts of the press in the positions assumed on completion of the molding operation.
FIGURE 10 is a fragmentary vertical sectional view through a portion of the press with parts interchanged to produce a product of somewhat different shape from the product produced by the press incorporating the parts shown in FIGURES 4 to 9, inclusive.

In the press construction shown the parts can be rearranged to alter the size of each mold cavity and the reduction in mold cavity volume effected by downward movement of each plunger 34 without altering the degree of movement of the movable block 35. Such mechanism includes providing one or more filler plates 38 between the movable block 35 and the stationary block 23 which plates can be mounted on either the movable or the stationary block or can be divided between them. In the construction shown four of these plates 38 are illustrated. In FIGURE 3 one of the plates 38 is shown secured by a screw 39 to the stationary block 23 and three of these plates are secured to the movable block 35. In FIGURE 8 one plate 38 is shown as being secured to the movable block 35 and three of these plates are secured to the stationary block 23.

Figures 5, 6:
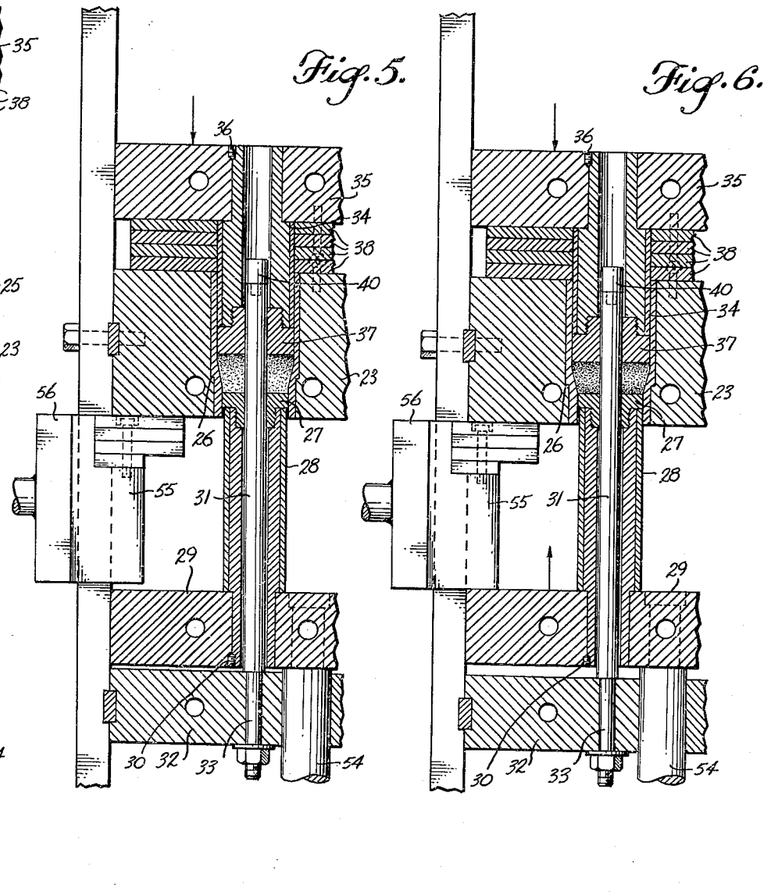
FIGURE 5 is a similar view showing the parts in position to accomplish an intermediate stage of the molding operation.
FIGURE 6 is a similar view showing the parts in the positions assumed upon completion of the molding operation.

It will be evident that, upon completion of the descent of the movable block 35, the plates 38 will all be in contiguous face-to-face engagement, as shown in FIGURES 5 and 6, whether all of the plates are mounted on the stationary block 23 or all the plates are mounted on the movable block 35 or part of the plates are mounted on one of the blocks and the remainder on the other block. The only effect of changing the mounting arrangement of the plates 38 is to alter the effective depth of the mold cavities 24. Such change in depth produces the double effect of altering the initial volume of each mold cavity and the relationship between the initial volume and the final volume of the mold cavity.

Each of the filler plates 38 has extending through it holes arranged in a pattern corresponding to the pattern of the mold cavities 24 in the stationary block 23 and of the same cross-sectional size and shape as the upper ends of the mold cavities. Consequently, the tips 37 of the upper plungers 34 will slide snugly within the apertures in the filler plates as well as the mold cavities. In filling the mold cavities with molding material the easiest way of insuring that each mold cavity is completely but not excessively filled is to scrape off all molding material above the upper surface of the stationary mold block 23 or the upper plate 38 mounted on it. Such material will be scraped into a hopper 14' for return to the storage bin. If central holes are to be provided in the molded product, however, it is necessary that the hole-forming rods 31 extend upward at least as high as the upper surface of the upper plate 38 mounted on the stationary block 23. It is undesirable, however, for the rods to project above the upper surface of such plate because such projecting parts would catch a scraper slid over the upper surface of the top plate 38 on the stationary block for the purpose of leveling the mold mixture in the cavities.

Figure 4:
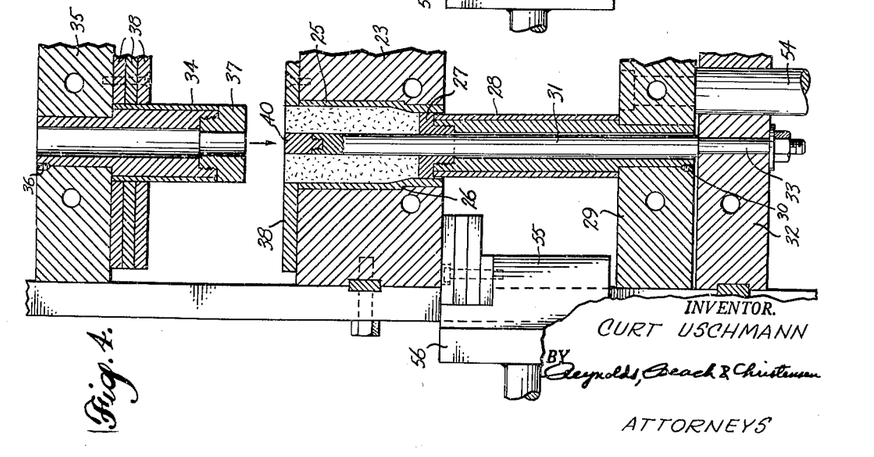
FIGURE 4 is a vertical sectional view through a portion of the molding press with the parts thereof in fully opened position prior to the commencement of a pressing operation.

It would of course be possible to provide some type of adjustment for altering the height of the rods 31 if the arrangement of the filler plates 38 is altered. Alternatively, each of the rods 31 could be removed and replaced in its entirety with a longer or shorter rod as might be necessary to locate the upper end of the rod flush with the upper surface of the top plate 38 on the block 23. A preferred rod construction is shown, however, in which the upper end of each rod 31 has a replaceable tip 40. Thus if three filler plates 38 are secured to the stationary block 23 as shown in FIGURE 8 the tip 40 on each rod 31 as shown in FIGURE 8 will be longer than the tip 40 provided on each rod when only a single filler plate is mounted on the stationary block 23 as shown in FIGURES 3 and 4, for example. If all of the plates 38 were mounted on the movable block 35 a rod tip even shorter than those shown in FIGURES 3 and 4 would be placed on each rod 31, whereas if all four filler plates were mounted on the stationary block 23 rod tips longer than that shown in FIGURE 8 would be used.

The sequence of movement of the press parts during a typical pressing operation is illustrated in FIGURES 4 to 7, inclusive. With the upper movable block 35 and the upper plungers 34 raised and the lower movable block 29 and lower plungers 28 lowered to the positions shown in FIGURES 3 and 4, the operator would draw a molding material supply sleeve 21 shown in FIGURE 1 into the space between the central stationary block 23 and the upper movable block 35. The operator would then close a switch to energize the motor 20 for driving the screw conveyor 18 to dispense material from the duct 14 through the supply sleeve 21. By telescopically varying the effective length of the supply sleeve and swinging it laterally about the axis of duct 14 the operator would move the discharge spout of the sleeve as necessary to fill completely all the mold cavities 24. He would then open the switch to stop motor 20 and interrupt the supply of molding material and would then push the material supply sleeve 21 toward the duct 14 until it was completely withdrawn out of the press.

When the mold cavities have thus been filled with molding material excess material is scraped off the top of the upper plate 38, or of the stationary block 23 if no filler plate is secured to it. The mold cavity will then be filled with molding material flush with the upper surface of the stationary mechanism and the upper end of the rod tip 40 as shown in FIGURE 4 and the press is in condition for commencement of the pressure molding operation. The upper movable block 35 can be moved downward by the fluid pressure piston and cylinder actuator 41 which may be either of the hydraulic or pneumatic type. Before the upper block 35 is moved downward, however, it is important that the operator's hands be clear of the space between the two blocks. Consequently, interconnected controls may be provided, one to effect energization of the fluid pressure actuator 41 and the other to release latching mechanism for the movable block which must be operated by separate hands.

In FIGURE 2 mechanical latch mechanism for the upper movable block 35 is shown as incorporating dogs 42 carried by shafts 43 mounted on opposite sides of the press. The shafts 43 are interconnected for limited rotation in opposite directions by a chain 44 engaging sprockets 45 secured to the shafts 43, respectively. Normally these shafts are urged in rotative directions tending to maintain the swinging ends of dogs 42 engaged beneath the movable block 35 to prevent its descent by tension springs 46 connected between the frame of the press and arms 47 secured to the respective shafts 43. To one of such shafts is also secured a control arm 48. By swinging this control arm in clockwise direction as seen in FIGURE 2 the chain 44 will be wound upon the sprocket 45 at the right and unwound from the sprocket 45 at the left as the shaft 43 at the right is turned clockwise and the shaft 43 at the left is turned counterclockwise. These shafts will be turned through equal angles because sprockets 45 are equal in size and when they have been turned sufficiently the tips of dogs 42 at opposite sides of the press will be withdrawn simultaneously from beneath the movable upper block 35.

A control switch for the fluid actuator 41 may include a start switch button 49 and a stop switch button 50. In series with the start switch button 49 is a further button switch 51 closed by swinging of control arm 48 into the latch-releasing position. To move the movable block 35 downward, therefore, the operator will press the start switch button 49 with one hand and swing the latch control lever 48 with the other hand until such lever engages and closes the switch 51. By that time the dogs 42 will have been moved into their latch-released position and the electrical circuit controlling supply of fluid to the fluid pressure actuator 41 will be energized to effect downward movement of the block 35. Even though the lever 48 and the button 49 are released after the upper movable block has moved initially downward past the dogs 42 the closing movement of the press will continue so that the operator can go to the other press shown in FIGURE 1 to fill its mold cavities and initiate its operation. A single workman can therefore fill and operate at least two presses, and perhaps more.

When the downward movement of the movable block 35 has thus been initiated as indicated in FIGURE 4, the movement will continue downward inserting the plungers 34 into the upper ends of the respective mold cavities as indicated in FIGURE 5. The molding material in the cavities will thus be compressed until downward movement of the block 35 is interrupted by abutment of the movable and stationary press parts. In the construction shown such abutment is between the upper surface of the filler plate mounted on the stationary block 23 and the lower surface of the lowest filler plate carried by the movable block 35. In FIGURE 5 the upper movable part of the press has reached its lowermost position and has greatly reduced the volume of the mold cavity. As the molding material is compressed friction between such molding material and the sides of the mold cavity will develop so that the compaction of the upper surface portion will be greater than the compaction of the lower surface portion. It is, however, desirable to produce comparable compaction of at least the principal surfaces of the molded article and consequently provision is also made for moving the lower plungers 28 upward into the mold cavities following completion of the downward stroke of the upper plungers as indicated in FIGURE 6.

The mechanism for moving the lower plungers 28 upward is shown best in FIGURE 2 as including a fluid pressure piston and cylinder actuator 52 which may be either of the pneumatic or hydraulic type. This actuator will engage and exert an upward pressure on a plate 53 slidably guided for vertical movement by the press frame 22. The lower movable block 29 and the plate 53 are interconnected for conjoint vertical movement by struts or posts 54 distributed over their areas as shown best in FIGURE 2. The lifting action of the actuator 52 on the plate 53 is therefore transmitted through these posts to the lower movable block 29 for lifting the plungers 28 carried by such movable block. The posts 54 extend through apertures in the fixed plate 32 which apertures may serve as guides for such posts.

It is preferred that the upper plungers 34 reach their fully lowered positions indicated in FIGURE 5 before the lower plungers 28 are moved upward. To accomplish this result both the upper actuator 41 and the lower actuator 52 are connected to the same fluid pressure source. The ram of the upper actuator is larger than that of the lower actuator, such as the upper actuator being fourteen inches in diameter and the lower actuator twelve inches in diameter. Consequently, the upper actuator will be moved fully down before the lower actuator moves upward and because of the greater pressure exerted by the upper actuator the lower actuator cannot cause the lower plungers 28 to move the upper plungers 34 upward at all after they have reached their lowermost position. Instead they will be held firmly in such lowermost position during the movement of the lower plungers from the positions shown in FIGURE 5 to those of FIGURE 6. A special regulating valve can be incorporated in the line between the source of fluid under pressure and the lower actuator 52 so that the desired compaction can be obtained on the lower surface of the product being molded.

Usually it is more important that the final molded products be of a predetermined size and shape than that there be a predetermined degree of compaction on their surfaces. Consequently, it is desirable to provide positive stop mechanism to limit the upward movement of the lower plungers 28 during the molding operation. Such stop mechanism is shown as including plates 55 mounted on a head 56 reciprocable by a fluid pressure piston and cylinder actuator 57 in a direction transversely of the directions of movement of the upper plungers 34 and the lower plungers 28. Such fluid actuator can be mounted on a bracket 58 secured to the press frame as shown in FIGURE 2. The stroke of such fluid actuator need only by sufficient to insert the plates 55 between the central stationary block 23 and the upwardly movable lower block 29 as shown in FIGURES 3 to 6, inclusive, and to withdraw the plates 55 from such position to the retracted position shown in FIGURE 7.

When the fluid under pressure has been supplied to the upper and lower fluid pressure actuators 41 and 52, first the upper plungers 34 will be moved downward to the position shown in FIGURE 5 and thereafter the pressure will increase sufficiently in the actuator 52 to raise the lower plungers 28. Upward movement of the lower movable block 29 to raise the plungers 28 will be interrupted by the stop plates 55 after the plungers have moved only a relatively short distance from the position shown in FIGURE 5 to that of FIGURE 6. Such movement will, however, be sufficient to effect compaction of the lower surface of the article being molded to a degree approximately equal to the compaction of the upper surface of the article. The fluid pressure is maintained in the actuators 41 and 52 to hold the plungers in the positions of FIGURE 6 compacting the molding material therebetween until the binder has set. If thermosetting binder is employed, such as phenolic resin or urea formaldehyde resin, for example, it will be necessary to heat the mold cavity block 23. Such heating conveniently can be accomplished by passing steam through the holes in the block alongside the die cavity, as well as holes in blocks 29, 32 and 35.

The setting of the resin can be accomplished within a few minutes under a pressure and at a temperature which is conventional in plywood manufacturing operations. At a temperature of 300 degrees Fahrenheit and a pressure of 500 pounds per square inch, for example, phenolic resin should set adequately within five minutes. Heating of the mold cavity block 23 to a temperature in the neighborhood of 300 degrees Fahrenheit might cause sufficient expansion of the parts so that a close fit of the various parts would no longer be maintained. Also, if the plungers 34 and 28 are relatively cold the molding material in the mold cavities would not be heated uniformly over the entire surface of each molded article. Consequently, both the upper and lower movable plunger-carrying blocks 35 and 29 are heated, as well as the stationary block 32, to approximately the same temperature, to effect uniform expansion of all parts of the press and maintain alignment of the relatively movable parts.

Figure 7:
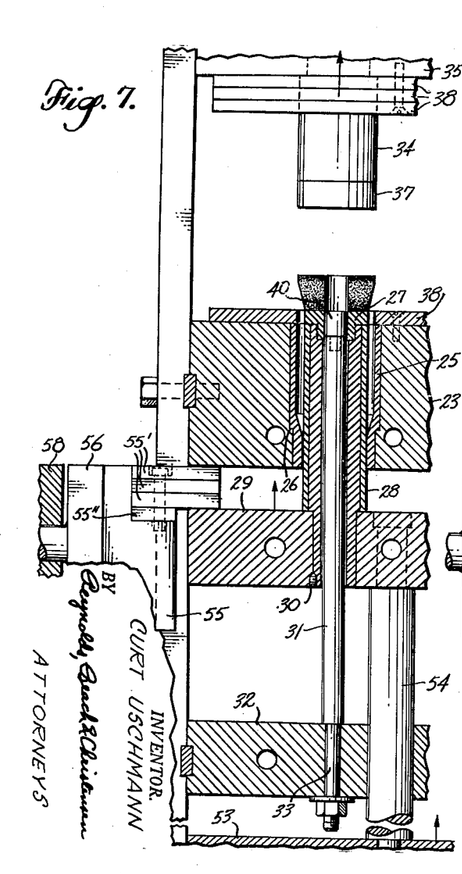
FIGURE 7 is a similar view with the parts of the press in position extracting the molded product.

After the molding material has thus been set the supply of fluid under pressure to the upper actuator 41 may be reversed to lift the upper movable block 35 and the upper plungers 34 from the position shown in FIGURE 6 to that of FIGURE 7. Fluid under pressure will still be supplied to the actuator 52 in a direction to raise plate 53, however, and consequently if the fluid actuator 57 is operated to withdraw the stop plates 55 from the position shown in FIGURE 6 to that of FIGURE 7 the plate 53, posts 54, lower movable block 29 and plungers 28 will be moved upward until such block engages the lower stop plates 55' mounted on the upper portion of plates 53. The number and thickness of the projecting stop plates 55' will correspond to the number and thickness of the filler plates 38 mounted on the upper movable block 35 and are supported on shorter plates 55" equal in number and thickness to the filler plates 38 mounted on stationary block 23. The upper ends of the lower plunger tips 27 are thus raised to the level of the upper ends of the tips 40 on rods 31 and the upper surface of the stationary mold block assembly, either the upper surface of the block 23 or of a filler plate 38 secured on it. The finished molded products can then be swept easily from the press.

In FIGURE 8 the same mold cavity sleeve 25 and upper and lower plungers are used as in FIGURES 4 to 7, inclusive, but the filler plates 38 have been redistributed between the upper movable block 35 and the lower stationary block 23 so as to provide a deeper and consequently larger mold cavity. Also the tip 40 of rod 31 is longer than the tip of such rod used in FIGURES 4 to 7 so that its upper end will be flush with the upper surface of the top filler plate 38 mounted on the stationary block 23. Such an increase in mold cavity volume enables less dense molding material to be used for the production of an article having a density and molded form generally comparable to a product made from more dense molding material or by the use of generally similar molding material the density of the final molded product will be greater. The shape and size of the final product will be the same despite this rearrangement of molding press parts but more material received in the larger cavity will simply be compressed into the same final cavity. In FIGURE 9 the upper plunger 34 is shown in its lowermost position and the lower plunger 28 has been raised to form the maximum contracted condition of the cavity maintained during setting of the resin in the mold material.

FIGURE 10 shows the same general type of press construction as illustrated in FIGURES 2 to 9, inclusive, except that the mold cavity sleeve 25 shown in such previously described press construction has been replaced by the sleeve 25' fitting a bore the stationary block 23 which has a smaller internal diameter. In order to enable the upper plungers to be inserted into such smaller sleeves, the tip of each plunger is replaced by a tip 37' having a smaller diameter corresponding to that of the sleeve's internal diameter. The size of the plunger body is reduced by omitting the sleeve between the movable block 35 and the plunger tip which is used in the arrangement of FIGURES 3 to 9. While the axial extent of the plunger tip 37' is the same as that of the plunger tip 37 a plunger tip having a different axial extent could be used if it were desired to vary the axial extent of the mold cavity in its fully contracted condition.

Also in order to enable the lower plunger 28 to be inserted into the lower end of the cavity the tip of the lower plunger shown in FIGURES 4 to 9, inclusive, has been replaced by the plunger tip 27'. This plunger tip not only is of smaller diameter but also is of different shape having an upwardly projecting central portion. The body of the plunger is reduced to the desired size by omitting the sleeve shown extending between the lower movable block 29 and the tip 27 in FIGURES 4 to 9, inclusive. While the mold cavity sleeves 25' have the smallest internal diameters with which the plungers 34 and 28 could cooperate, it is possible as has been mentioned previously to replace these plungers in the movable blocks with plungers of a different size. Also if a larger diameter mold cavity sleeve were to be used, plunger sleeves having thicker walls could be employed if it were considered necessary to provide support for the periphery of the larger plunger tips which would be required.

In FIGURES 11, 12 and 13 a somewhat different type of molding press is used. This is generally the type of press which would be employed for making molded chair backs, shoes or shoe soles, and other generally flat molded articles. In this instance the stationary mold cavity block 59 is shown as having only a single mold cavity in it for illustrative purposes although it might include more than one mold cavity if desired. The lower end of such mold cavity is closed by a bottom plunger 60 and an upper plunger 61 is supported and guided for movement downward into the upper end of the mold cavity. Fluid pressure piston and cylinder actuators, not shown, are appropriately connected to these plungers to effect vertical movement of them. The mold cavity would be filled with molding material of the type discussed above and the upper plunger 61 would then be moved downward to the position shown in FIGURE 12. Thereafter the lower plunger 60 would be raised into the position also shown in this figure to compact the upper and lower sides of the molded article which are its principal surfaces.

Pressure exerted on the molding material transversely of the principal surfaces of the molded article is relatively ineffective to compact the material in the edges of the molded article. Consequently auxiliary plungers 62 are provided to move into the mold cavity in directions substantially perpendicular to the directions of movement of the lower plunger 60 and the upper plunger 61. These auxiliary plungers 62 are movable by fluid pressure piston and cylinder actuators 63 from positions such as shown in FIGURES 11 and 12 to a position like that shown in FIGURE 13. When the upper and lower plungers have been closed to the positions shown in FIGURE 12 the actuators 63 at opposite sides of the mold cavity block 59 will then be energized to move the auxiliary plungers 62 simultaneously toward the mold cavity to positions flush with the principal wall of the mold cavity as shown in FIGURE 13.

When the top, bottom and side plungers have been moved into the positions shown in FIGURE 13 they will be held in such positions until the molding material has set. Such molding material may be heated by steam supplied to suitable ducts in the mold cavity block 59 and the plungers 60 and 61 as discussed in connection with the type of molding press first described but such steam passages have not been shown in FIGURES 11, 12 and 13. When the mold material has set the upper plunger 61 will be raised, the auxiliary plungers 62 will be withdrawn outward by the actuators 63 and the lower plunger 60 will be moved upward approximately to or beyond the upper surface of the upper filler plate 38' secured to the stationary mold cavity block 59 in order to enable the completed article to be removed from the molding press.

The press described above is particularly useful for molding articles composed of fibrous woody material bonded together by adhesive preferably of the thermosetting type. Despite the tendency of such molding material to pack where the pressure is applied rather than being of uniform density throughout, it has been found that where pressure is applied separately to each of a plurality of sides of an article, each of such sides will be compacted to substantially uniform density and the density of such plurality of sides to which pressure is applied independently will be substantially equal. Center plugs for paper rolls, for example, can therefore be produced in which each end, to which pressure is applied separately, is uniformly hard and the opposite ends are of substantially equal hardness.

Alternatively, if an article such as a chair back is being molded, the surfaces of the chair back ends can be compacted so as to have substantially uniform hardness and, despite the far greater extent of the material between the chair back ends, the hardness of such ends will be substantially equal to the hardness of the principal surfaces where the pressure is applied initially.

I claim as my invention:

1. A molding press comprising a mold cavity block having a plurality of mold cavities therein, movable closure means above said mold cavity block and movable downward to close the upper ends of said mold cavities, a lower movable block carrying plungers projecting upwardly therefrom and extending into the lower portions of said respective mold cavities, means guiding said lower movable block for upward movement to move said plungers in the bottom portions of said cavities, rigid stop means engageable by said lower movable block and limiting upward movement of said plungers and said lower movable block, retracting means operable to retract said stop means out of the path of movement of said lower movable block to permit further upward movement of said plungers and said lower movable block relative to said mold cavity block and means guiding said stop means for such retracting movement transversely of the direction of movement of said lower moveable block.

2. A molding press comprising a mold cavity block having a plurality of mold cavities therein, a movable upper block located above said mold cavity block and having plungers projecting downwardly therefrom, each of a size to fit into the upper end of one of said mold cavities and arranged in a pattern corresponding to the pattern of said mold cavities, means supporting said upper movable block with said plungers in registry with said respective mold cavities and guiding said upper movable block for movement downward to insert said plungers into said mold cavities, respectively, a filler plate disposed between said mold cavity block and said movable upper block, having a plurality of apertures therein corresponding in size, shape and location with the mold cavities and disposed in registry with said plungers and mold cavities, and securing means carried by said mold cavity block and said movable upper block adapted to secure said filler plate selectively to the top of said mold cavity block for increasing the depth of the mold cavities and to the bottom of said movable upper block for decreasing the depth of the mold cavities by the thickness of said filler plate while terminating downward movement of said movable upper block with its plungers in the same relationship to the mold cavities in said mold cavity block irrespective of the block to which said filler plate is secured by said securing means and the upper and lower sides of said filler plate engaged, respectively, by said upper block and by said mold cavity block.

3. A molding press comprising a mold cavity block having a plurality of mold cavities therein, a movable upper block located above said mold cavity block and having plungers projecting downwardly therefrom, each of a size to fit into the upper end of one of said mold cavities and arranged in a pattern corresponding to the pattern of said mold cavities, means supporting said upper movable block with said plungers in registry with said respective mold cavities and guiding said upper movable block for movement downward to insert said plungers into said mold cavities, respectively, a removable filler plate disposed between said mold cavity block and said movable upper block, having a plurality of apertures therein corresponding in size, shape and location with the mold cavities and disposed in registry with said plungers and mold cavities, securing means carried by said mold cavity block and said movable upper block adapted to secure said filler plate selectively to the top of said mold cavity block for increasing the depth of the mold cavities and to the bottom of said movable upper block for decreasing the depth of the mold cavities by the thickness of said filler plate while terminating downward movement of said movable upper block with its plungers in the same relationship to the mold cavities in said mold cavity block irrespective of the block to which said filler plate is secured by said securing means and the upper and lower sides of said filler plate engaged, respectively, by said upper block and by said mold cavity block, an upright core rod extending upward into each mold cavity, and means below said mold cavity block supporting said core rods, each of said upright core rods having a removable tip of a length to dispose the upper end of said tip flush with the top of its mold cavity irrespective of the depth of such cavity, and each of said plungers having a recess in its lower end to fit over the upper end of one of said core rods.

4. A molding press comprising a block having a plurality of rows of mold cavities therein, an upright core rod extending upwardly into each mold cavity, a core rod mounting plate below said mold cavity block supporting said core rods arranged in a plurality of rows, closure means above said mold cavity block and movable downward to close the upper ends of said mold cavities, a lower movable block of a shape and extent in plan substantially similar to said core rod mounting plate, disposed between said mold cavity block and said core rod mounting plate and carrying a plurality of rows of lower plungers projecting upwardly therefrom, each of said lower plungers encircling one of said core rods and extending into the lower portion of a mold cavity into which such core rod extends, pressure means below said core rod mounting plate of a shape and extent in plan substantially similar to said core rod mounting plate, and a plurality of rods distributed over said pressure means, extending upwardly through said core rod mounting plate among said core rods at locations farther from the edges of said core rod mounting plate than at least some of said core rods and engaging said lower movable block to transmit movement of said pressure means to said lower movable block for moving it upward while said core rod mounting plate remains stationary.

5. A molding press comprising a block having a plurality of mold cavities distributed thereover, closure means above said block and movable downward to close the upper portion of said mold cavities, a telescoping extension molding material supply duct at one side of said block including a plurality of sections relatively movable lengthwise of said duct, a source of molding material connected to said molding material supply duct, and means swingably supporting said duct for conveying molding material from said molding material source to all the mold cavities by conjoint telescoping and swinging movements of said supply duct.

References Cited in the file of this patent

UNITED STATES PATENTS 350,048     Du Pont _______________ Sept. 28, 1886

(Other references on following page)

UNITED STATES PATENTS

| | | |
|---|---|---|
| 989,211 | Updegroff | Apr. 11, 1911 |
| 1,141,134 | Metzner | June 1, 1915 |
| 1,541,357 | Johnson | June 9, 1925 |
| 2,028,021 | Shippy | Jan. 14, 1936 |
| 2,219,048 | Magnenat | Oct. 22, 1940 |
| 2,350,319 | Strauss | May 30, 1944 |
| 2,398,227 | Hubbert | Apr. 9, 1946 |
| 2,415,462 | Cherry et al. | Feb 11, 1947 |
| 2,490,229 | Quarnstrom | Dec. 6, 1949 |
| 2,541,899 | Wellman | Feb. 13, 1951 |
| 2,558,823 | Crowley et al. | July 3, 1951 |
| 2,598,016 | Richardson | May 27, 1952 |
| 2,675,581 | Payne | Apr. 20, 1954 |
| 2,777,162 | Banzhof | Jan. 15, 1957 |
| 2,789,332 | Scott | Apr. 23, 1957 |
| 2,926,412 | Stacy et al. | Mar. 1, 1960 |

FOREIGN PATENTS

| | | |
|---|---|---|
| 610,011 | Great Britain | Oct. 11, 1948 |
| 663,040 | Great Britain | Dec. 12, 1951 |